United States Patent [19]

Jean et al.

[11] Patent Number: 5,740,696
[45] Date of Patent: Apr. 21, 1998

[54] TRANSMISSION UNIT FOR OFFICE MACHINE

[75] Inventors: Jaw-kuen Jean, Taipei Hsien; Chuan-Sheng Li, Taipei; Bor-Harn Lin, Taipei Hsien, all of Taiwan

[73] Assignee: Sampo Corporation, Taipei, Taiwan

[21] Appl. No.: 695,959

[22] Filed: Aug. 13, 1996

[51] Int. Cl.$^6$ ............................................. F16H 3/34
[52] U.S. Cl. .................. 74/354; 74/397; 74/405; 74/406; 74/421 A; 475/15
[58] Field of Search ................ 74/395, 396, 397, 74/405, 406, 421 A, 665 GA, 665 P, 25, 52, 353, 354; 475/14, 15, 16, 332, 343, 346

[56] References Cited

U.S. PATENT DOCUMENTS

| | | | |
|---|---|---|---|
| 2,610,520 | 9/1952 | Snow | 74/52 |
| 3,670,861 | 6/1972 | Zenner et al. | 74/405 |
| 3,943,786 | 3/1976 | Mills | 74/405 |
| 4,478,313 | 10/1984 | Wakase | 74/406 |

*Primary Examiner*—Rodney H. Bonck
*Assistant Examiner*—Sherry L. Estremsky

*Attorney, Agent, or Firm*—Beveridge, DeGrandi, Weilacher & Young LLP

[57] ABSTRACT

A transmission unit mounted on the machine base of an office automation machine and covered with a cover and controlled to turn a first roller and a second roller, including a gear transmission mechanism, a first roller transmission mechanism driven and a second roller transmission mechanism respectively driven by the gear transmission mechanism to turn the rollers, wherein the gear transmission mechanism includes a motor, a rounded seat raised from the machine base, a drive gear mounted on the rounded seat and coupled to the motor, an annular gear holder revolvably mounted around the rounded seat and having an upright gear shaft, an upright axle raised from the machine base adjacent to the rounded seat, a crank having a pivot hole at one end coupled to the upright axle and a gear shaft at an opposite end, a first planet gear revolvably mounted around the gear shaft of the crank and driven by the drive gear to turn the first roller transmission mechanism, a second planet gear revolvably mounted around the gear shaft of the annular gear holder and driven by the drive gear to turn the second roller transmission mechanism; the cover has an arched slot, which receives the gear shaft of the annular gear holder to guide the movement of the second planet gear along the teeth of the drive gear within a fixed angle.

1 Claim, 7 Drawing Sheets

TRANSMISSION UNIT FOR OFFICE MACHINE

BACKGROUND OF THE INVENTION

The present invention relates to office automation machines for example fax machines, and relates more particularly to the transmission unit of an office automation machine which prevents the gears from being jammed, and permits jammed paper to be conveniently pulled out of the machine.

In an office automation machine for example a fax machine, the transmission unit comprises a first roller and a second roller. When at the incoming or copy mode, the first roller and the second roller are simultaneously rotated to let off the thermal paper; when at the outgoing mode, only the first roller is rotated to feed document. FIG. 1 shows the transmission unit of a fax machine according to the prior art. As illustrated, the gear transmission mechanism 1a comprises a motor 10a, two planet gears 12a, 13a mounted on a gear mount 14a, and a drive gear 11a mounted on the gear mount 14a and meshed between the planet gears 12a, 13a and coupled to the output shaft of the motor 10a. The driven gear sets 20a, 30a of the first roller 2a and second roller 3a are disposed at two opposite sides of the motor 10a and meshed with the planet gears 12a, 13a respectively. In order to enable the first roller 2a to be maintained in a constant steering direction during the forward and reverse rotation of the motor 10a, a first idle wheel 21a and a second idle wheel 22a are installed in the driven gear set 20a. Referring to FIG. 2, when the motor 10a turns clockwise during the outgoing mode of the fax machine, the second roller 3a does no work, the planet gear 12a of the gear transmission mechanism 1a matches with the first idle wheel 21a of the driven gear set 20a to turn the first roller 2a, causing it to feed document forwards. Referring to FIG. 3, when the motor 10a turns counter-clockwise during the incoming or copy mode of the fax machine, the planet gear 12a is forced into engagement with the second idle wheel 22a of the driven gear set 20a, thereby causing the first roller 2a and the second roller 3a to be simultaneously rotated to let off the thermal paper for printing. In the aforesaid gear transmission mechanism, the planet gears 12a, 13a and the drive gear 11a are mounted on the gear mount 14a, and the drive gear 11a is meshed between the planet gears 12a, 13a, an interference tends to occur between the gears 11a, 2a, 13a. Because the planet gears 12a, 13a are respectively disposed in mesh with the driven gear set 20a of the first roller 2a and the driven gear set 30a of the second roller 3a, it is difficult to turn the first roller 2a and the second roller 3a when document is jammed in the transmission unit.

SUMMARY OF THE INVENTION

The present invention has been accomplished to provide a transmission unit which eliminates the aforesaid drawbacks. According to one aspect of the present invention, the drive gear is mounted on a rounded seat at one side of the machine base, the two planet gears are respectively mounted on the gear shaft of an annular gear holder and the gear shaft of a crank. Therefore, the engagement between the drive gear and the planet gears can be respectively adjusted subject to the operation mode of the machine. According to another aspect of the present invention, the annular gear holder is revolvably mounted around the rounded seat, the crank is turned about an upright axle of the machine base. Therefore, when jammed document is pulled back, the planet gears are forced to disconnect from the first roller transmission mechanism and the second roller transmission mechanism of the transmission unit, permitting the first roller and the second roller of the machine to be freely rotated.

DETAILED DESCRIPTION OF THE PREFERRED EMBODIMENT

Figure 1:
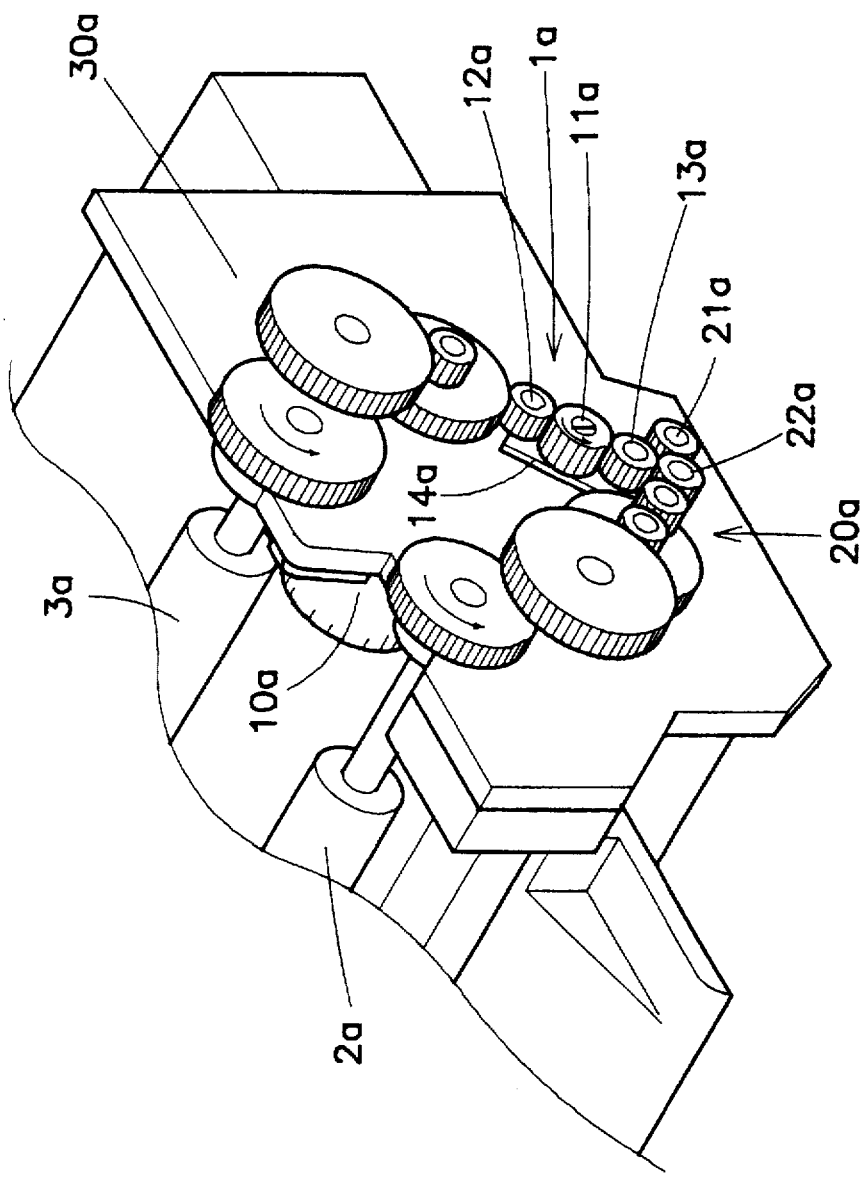
FIG. 1 shows the gear transmission unit of a fax machine according to the prior art.
Figure 2:
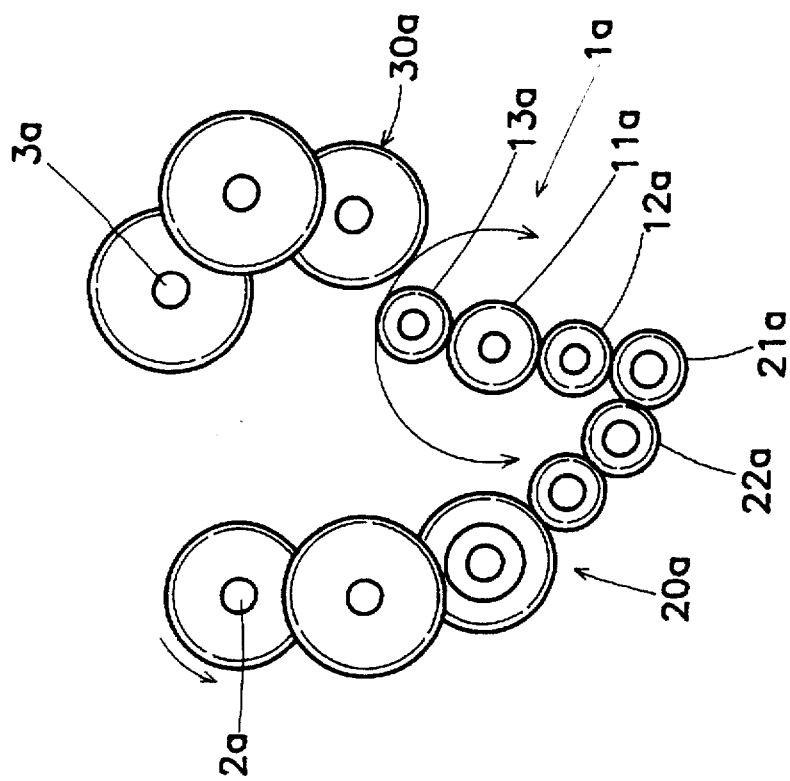
FIG. 2 is a plain view of the gear transmission unit shown in FIG. 1, showing the motor turned clockwise.
Figure 3:
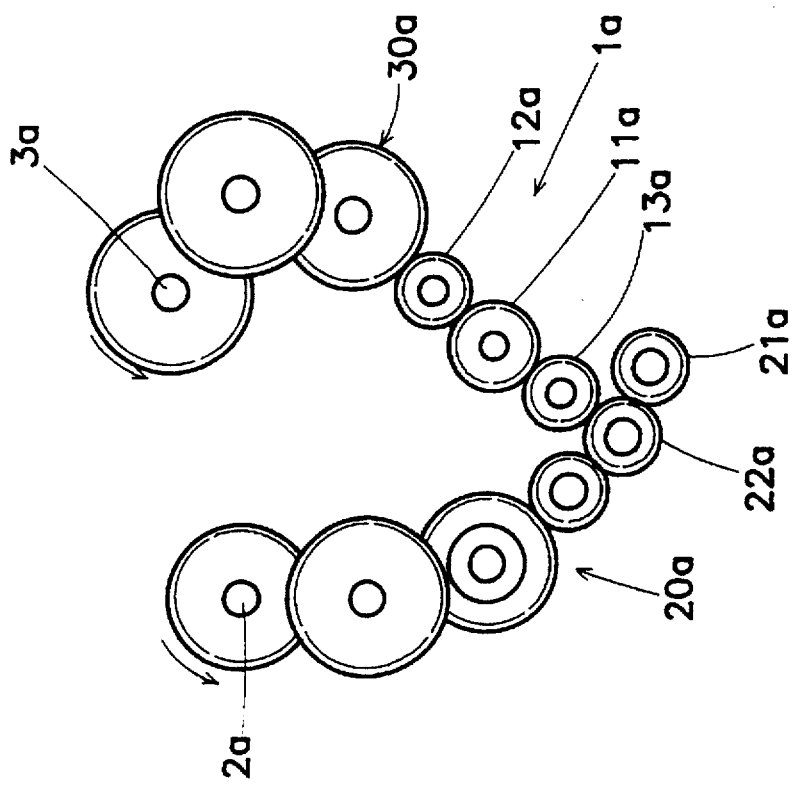
FIG. 3 is another plain view of the gear transmission unit shown in FIG. 1, showing the motor turned counter-clockwise.
Figure 4:
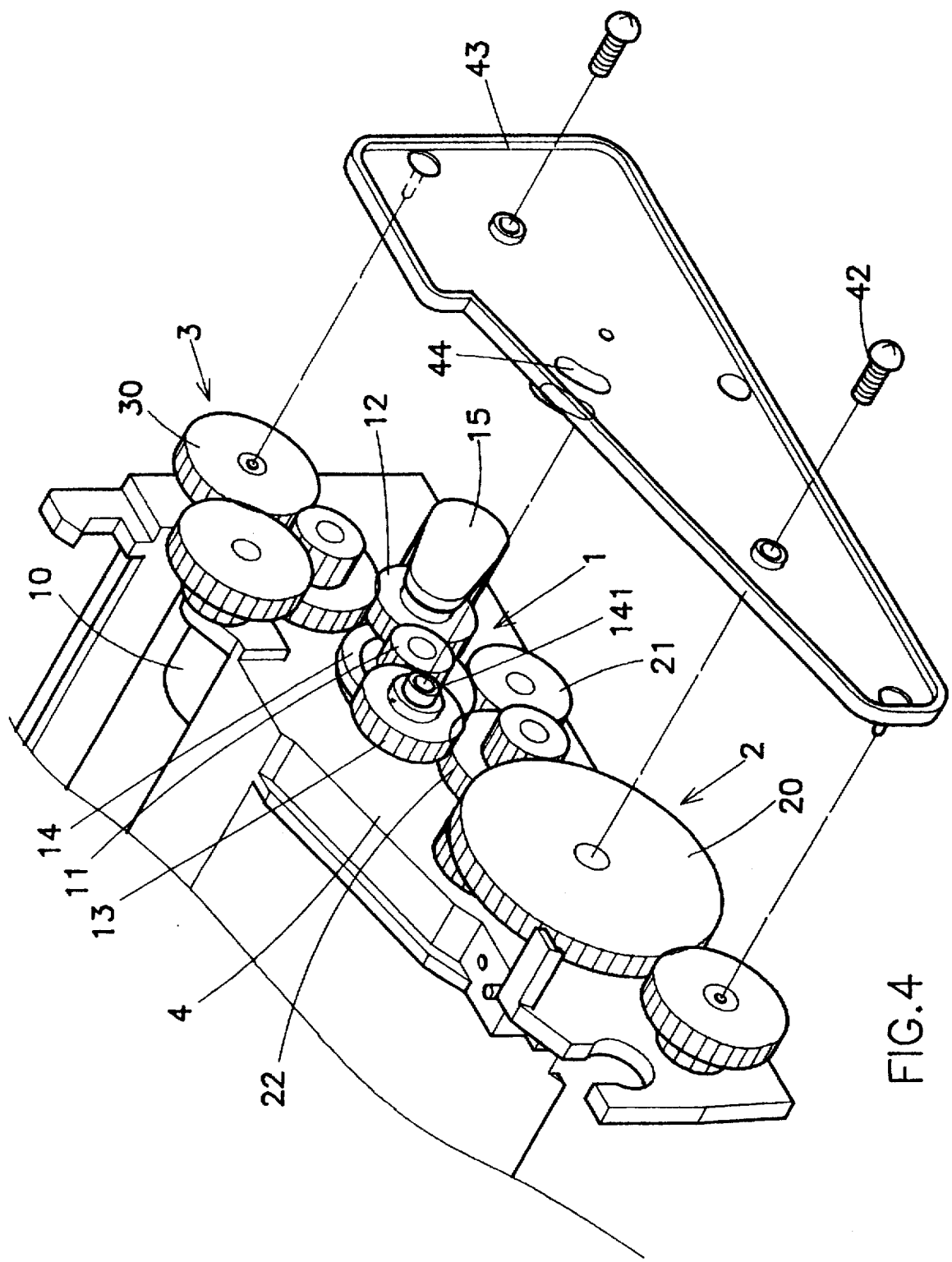
FIG. 4 is an assembly view of the gear transmission unit of a fax machine according to the present invention.
Figure 5:
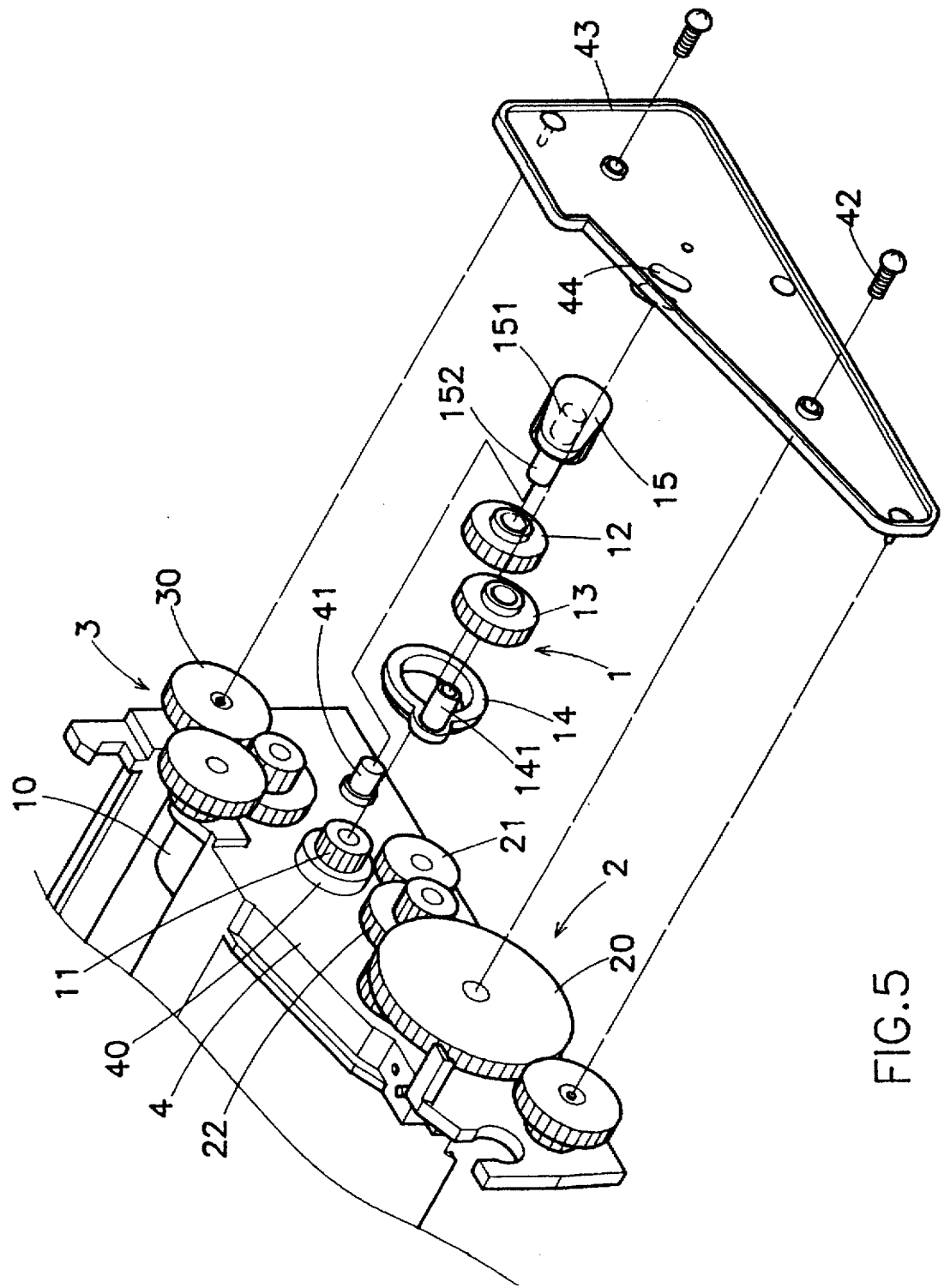
FIG. 5 is an exploded view of the gear transmission unit shown in FIG. 4.

Referring to FIGS. 4 and 5, the transmission unit which is mounted in the machine base 4 of art office automation machine for example a fax machine, is generally comprised of a gear transmission mechanism 1, a first roller transmission mechanism 2, and a second roller transmission mechanism 3.

The gear transmission mechanism 1 comprises a motor 10, a drive gear 11 mounted on a rounded seat 40 at one side of the machine base 4 and coupled to the output shaft of the motor 10, an annular gear holder 14 revolvably mounted around the rounded seat 40 and having an upright gear shaft 141, an upright axle 41 raised from the machine base 4, a crank 15 having a pivot hole 151 at one end coupled to the upright axle 41 and a gear shaft 152 at an opposite end, a first planet gear 12 revolvably mounted around the gear shaft 152 of the crank 15 and meshed with the drive gear 11 at one side, a second planet gear 13 revolvably mounted around the gear shaft 141 of the annular gear holder 14 and meshed with the drive gear 11 at an opposite side.

The first roller transmission mechanism 2 and the second roller transmission mechanism 3 are driven to turn the first roller and the second roller (not shown) respectively. The driven gear sets 20, 30 of the first roller transmission mechanism 2 and second roller transmission mechanism 3 are respectively mounted on the machine base 4 at two opposite sides of the drive gear 11, and respectively meshed with the planet gears 12, 13. The first roller transmission mechanism 2 comprises a first idle wheel 21 and a second idle wheel 22. When the gear transmission mechanism 1, the first roller transmission mechanism 2, and the second roller transmission mechanism 3 are installed, a cover 43 is fastened to the machine base 4 by screws 42 and covered over the gear transmission mechanism 1, the first roller transmission mechanism 2, and the second roller transmission mechanism 3. The cover 43 has an arched guide slot 44, which receives the gear shaft 141 of the annular gear holder 14 to guide the movement of the second planet gear 13 along the teeth of the drive gear 11 within a fixed angle.

Figure 6:
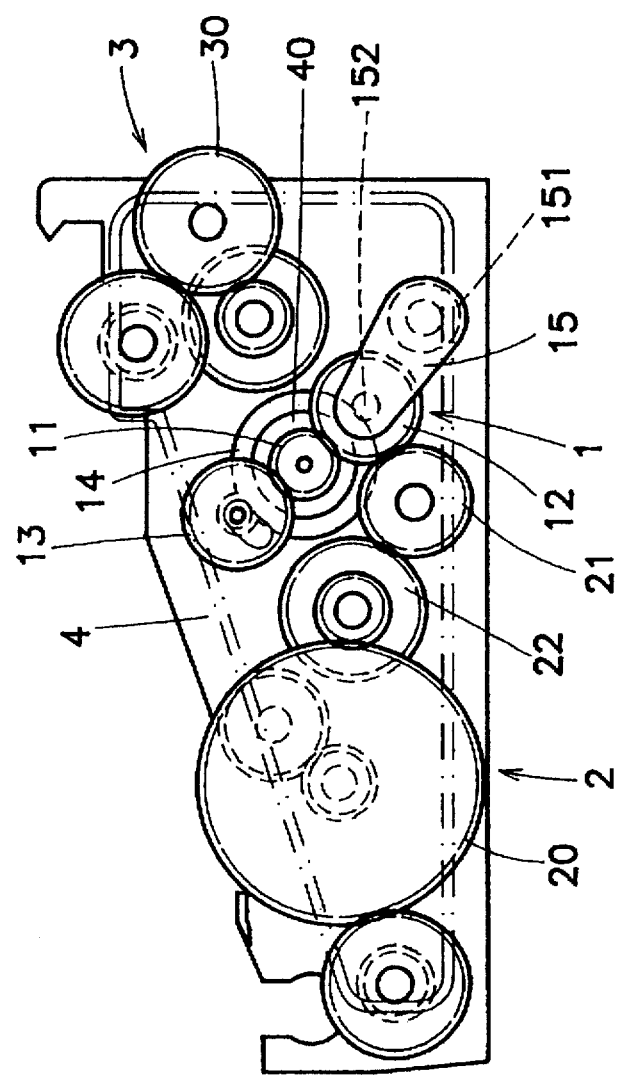
FIG. 6 is a plain view of the gear transmission unit shown in FIG. 4, showing the motor turned clockwise.

Referring to FIG. 6, when the motor 10 turns clockwise during the outgoing mode of the fax machine, the second roller transmission mechanism 3 (the second roller) does no work, the first planet gear 12 of the gear transmission mechanism 1 matches with the first idle wheel 21 of the first roller transmission mechanism 2 to turn the first roller, causing it to feed document forwards.

Figure 7:
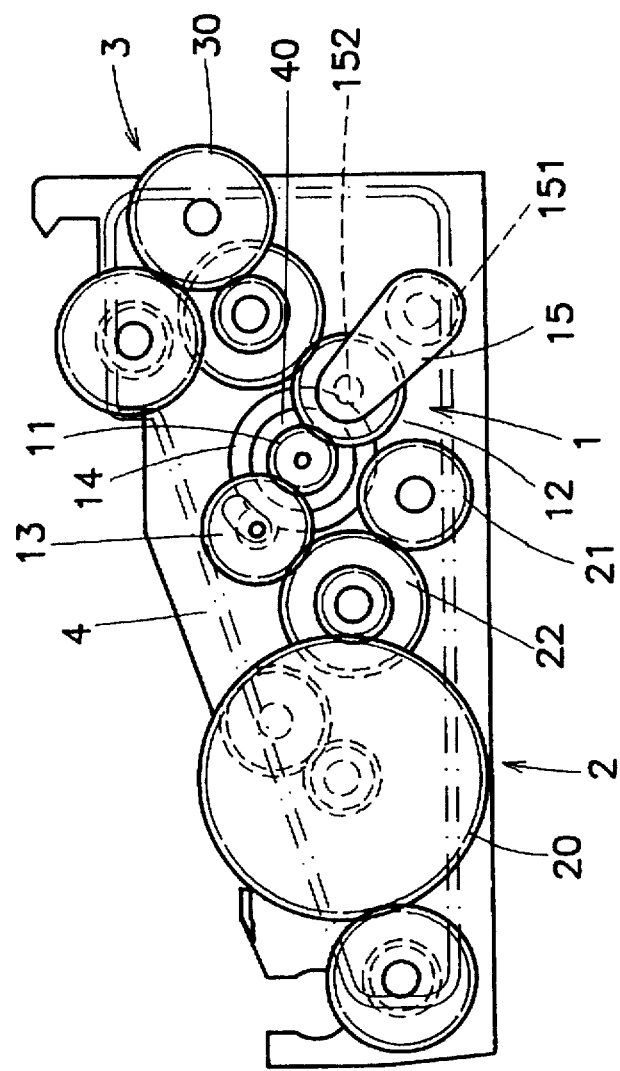
FIG. 7 is another plain view of the gear transmission unit shown in FIG. 4, showing the motor turned counter-clockwise.

Referring to FIG. 7, when the motor 10 turns counter-clockwise during the incoming or copy mode of the fax machine, the first planet gear 12 is forced into engagement with the driven gear set 30 of the second roller transmission mechanism 3, the second planet gear 13 is forced into engagement with the second idle wheel 22 of the first roller transmission mechanism 2, thereby causing the first roller transmission mechanism 2 and the second roller transmission mechanism 3 to be simultaneously rotated to turn the first roller and the second roller in letting off the thermal paper.

Because the first planet gear 12 and the second planet gear 13 are respectively mounted on the annular gear holder 14 and the crank 15, they are movable relative to each other, and the engagement between the drive gear 11 and the planet gears 12, 13 can be respectively adjusted without causing an interference. When document is jammed in the transmission unit, it can be easily pulled out of the machine. Because the annular gear holder 14 is revolvably mounted around the rounded seat 40 and the crank 15 is turned about the upright axle 41, when document is pulled back, the planet gears 12, 13 are forced to disconnect from the first roller transmission mechanism 2 and the second roller transmission mechanism 3, therefore the drive gear 11 is disengaged from the driven gear sets 20, 30 of the first roller transmission mechanism 2 and second roller transmission mechanism 3, permitting the first roller and the second roller to be freely rotated.

While only one embodiment of the present invention has been shown and described, it will be understood that various modifications and changes could be made thereunto without departing from the spirit and scope of the invention disclosed.

What the invention claimed is:

1. A transmission unit mounted on the machine base of an office automation machine and covered with a cover and controlled to turn a first roller and a second roller of the machine, comprising a gear transmission mechanism, a first roller transmission mechanism driven and a second roller transmission mechanism respectively driven by said gear transmission mechanism to turn said first roller and said second roller, wherein said gear transmission mechanism comprises a motor, a rounded seat raised from one side of the machine base, a drive gear mounted on said rounded seat and coupled to said motor, an annular gear holder revolvably mounted around said rounded seat and having an upright gear shaft, an upright axle raised from the machine base adjacent to said rounded seat, a crank having a pivot hole at one end coupled to said upright axle and a gear shaft at an opposite end, a first planet gear revolvably mounted around the gear shaft of said crank and driven by said drive gear to turn said first roller transmission mechanism, a second planet gear revolvably mounted around the gear shaft of said annular gear holder and driven by said drive gear to turn said second roller transmission mechanism; said cover has an arched slot, which receives the gear shaft of said annular gear holder to guide the movement of said second planet gear along the teeth of said drive gear within a fixed angle.

* * * * *